March 12, 1968  D. E. FLINCHBAUGH  3,372,973
TWO-DIMENSIONAL BEAM SCANNING DEVICE
Filed Feb. 8, 1965  4 Sheets-Sheet 1
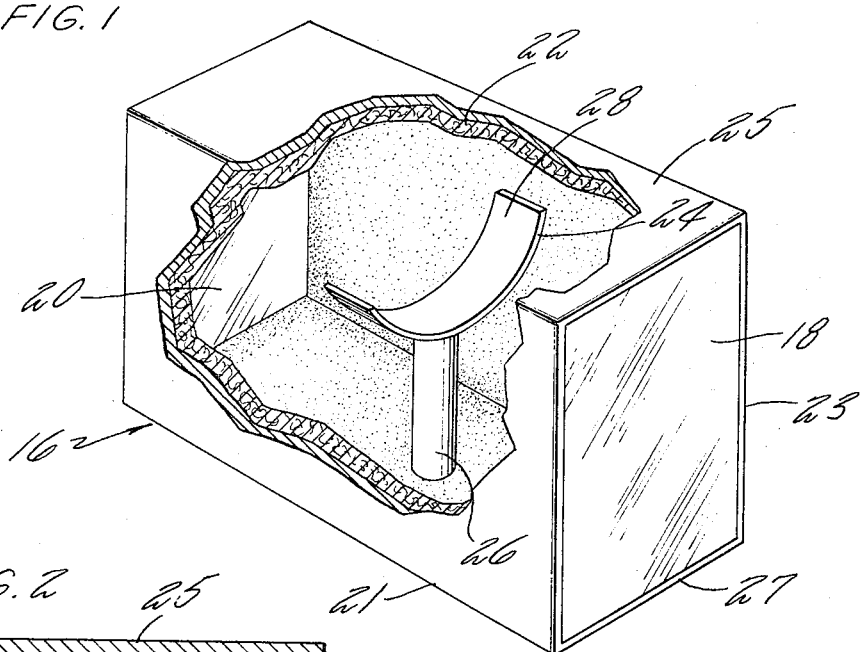
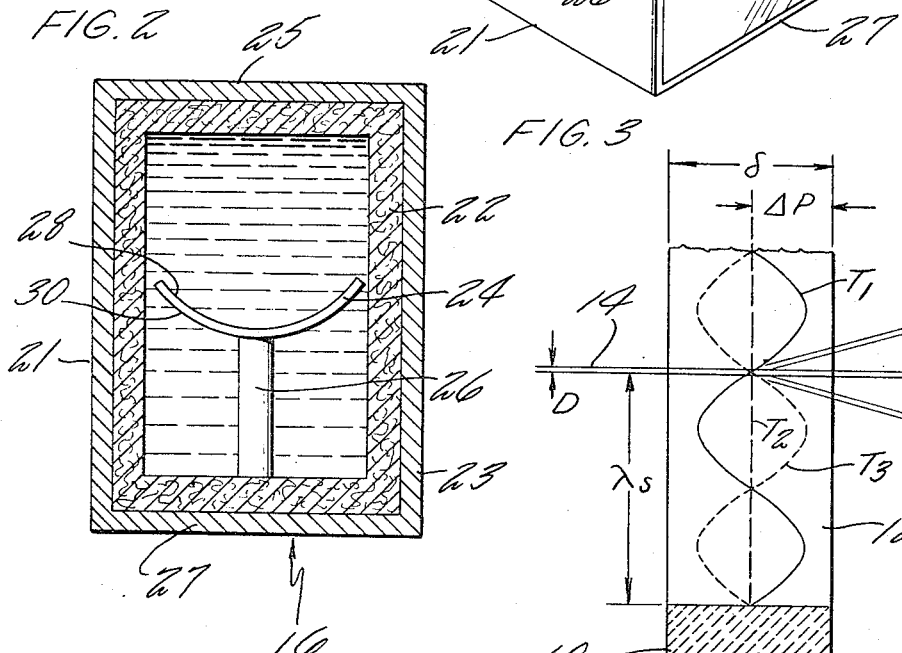
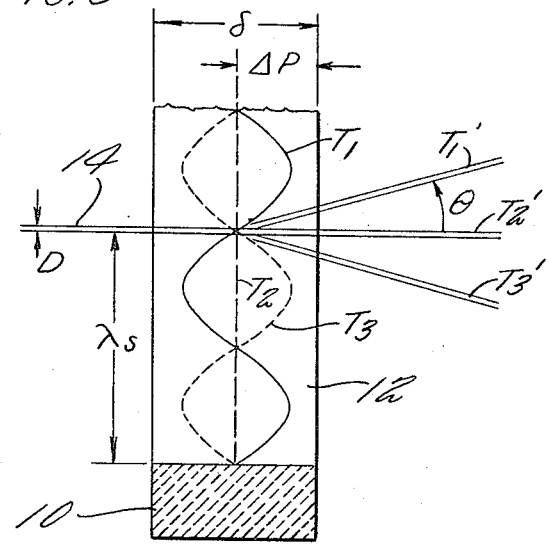
INVENTOR
DAVID E. FLINCHBAUGH
BY Donald J. Bradley
ATTORNEY FIG. 4
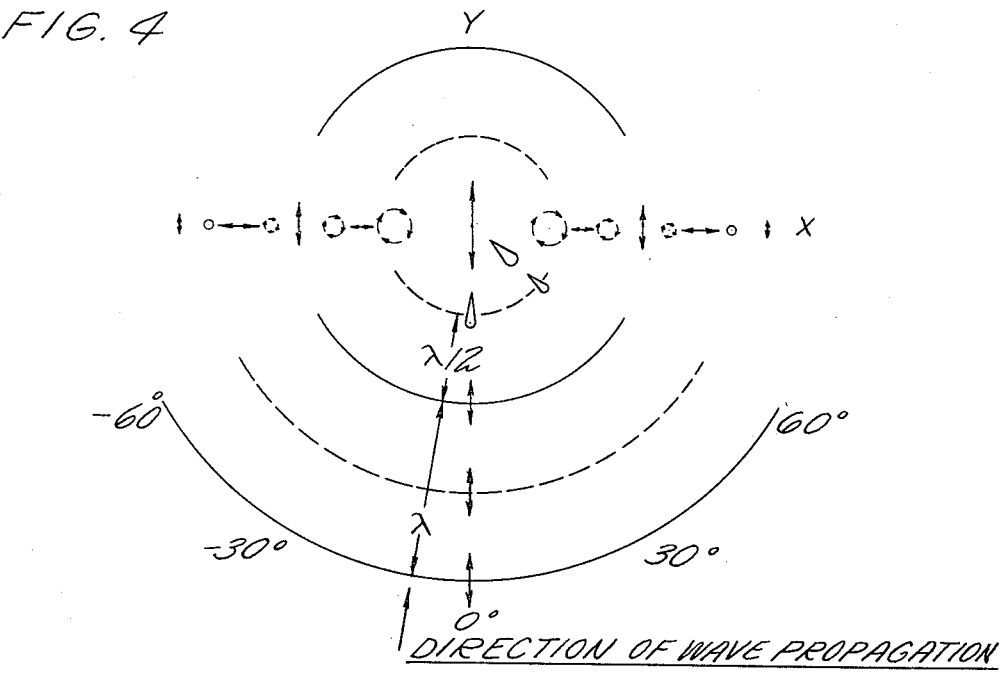
FIG. 8   FIG. 9A   FIG. 9B
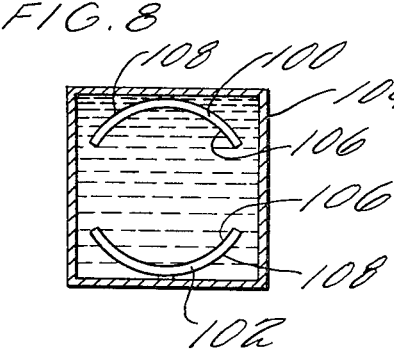 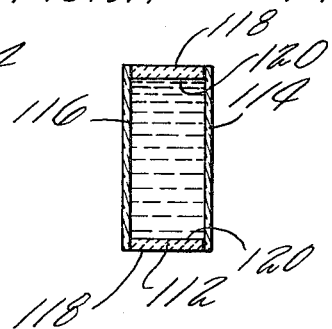 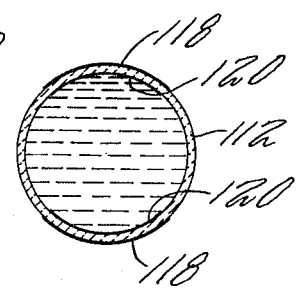

INVENTOR
DAVID E. FLINCHBAUGH
BY Donald J. Bradley
ATTORNEY

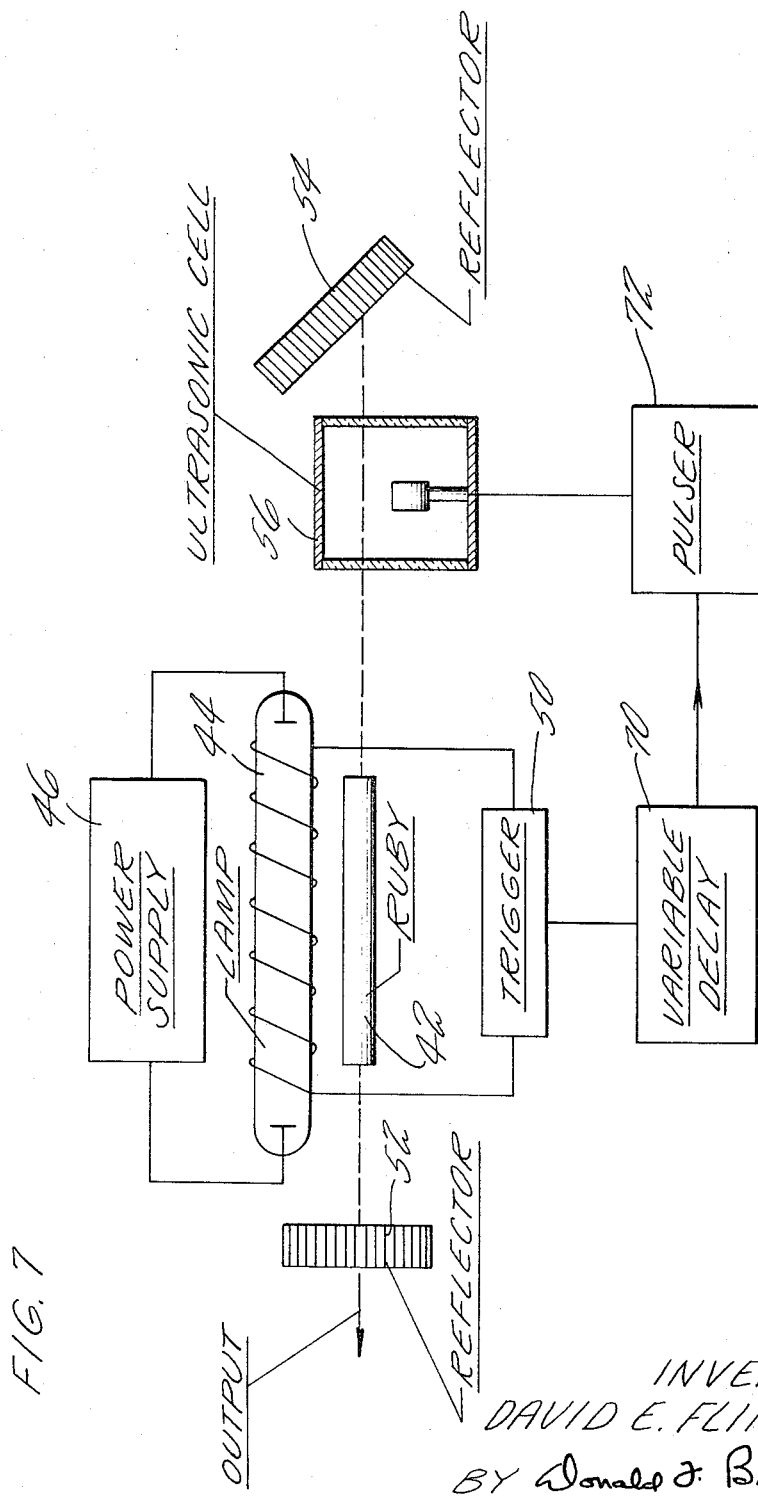

United States Patent Office 3,372,973
Patented Mar. 12, 1968

3,372,973
TWO-DIMENSIONAL BEAM SCANNING DEVICE
David E. Flinchbaugh, Andover, Conn., assignor to United Aircraft Corporation, East Hartford, Conn., a corporation of Delaware
Filed Feb. 8, 1965, Ser. No. 430,957
11 Claims. (Cl. 350—161)

ABSTRACT OF THE DISCLOSURE

A liquid acoustic cell has a curved or cylindrical transducers therein to which a sinusoidal actuating voltage is applied to produce focused acoustic waves therein. An optical beam passed through the cell adjacent the focal point of the acoustic waves will be deflected in a circular scanning motion.

---

This invention relates to an ultrasonic optical beam scanning device, and particularly to a liquid acoustic cell in which a single electromechanical transducer produces a deflection of a continuous optical beam in a circular scanning motion. The cell is particularly useful in periodically and nonmechanically deflecting a laser beam, and for laser cavity internal modulation applications.

The recent invention of the laser together with the abundance of potential applications for such a device has spurred the search for some means to accurately control the direction of a beam of light. For use in optical scanning systems it is preferable that such control be rapid and non-mechanical. It has long been recognized that one means for achieving such control is utilization of the principle that a light beam will be refracted when passed through a density gradient. Both refraction and diffraction effects have been observed when a collimated light beam traverses a transparent material normal to a high frequency sound field propagating in the same material. Ultrasonic techniques have also been used to modulate the output of a laser as disclosed in copending application Ser. No. 228,969, entitled Ultrasonic Control of Lasers, by Anthony J. De Maria, filed Oct. 8, 1962, and assigned to the same assignee as this application. The modulation technique disclosed in the referenced application utilizes ultrasonic techniques for perturbing the optical properties of the optical resonator cavity of a laser, thereby controlling the intensity and duration of the coherent output radiation.

Such optical generators and nonmechanical scanning devices are particularly useful for detecting, ranging and imaging systems. In addition, optical memory systems for computers require a beam deflecting device for fast read and write operations.

Previous work on ultrasonic optical beam scanning cells has been relatively unsuccessful in that the maximum obtainable beam deflection was small, or two cells were required to deflect the laser beam to illuminate a two-dimensional area. This invention avoids the difficulties of prior art devices by providing a novel cell design through which a light beam can be nonmechanically deflected in a circular scanning motion by establishing an ultrasonic time-varying refractive index gradient in a suitable medium. Only a single cell is required to produce an active optical imaging system producing periodic two-dimensional field illumination. Furthermore, laser cavity internal modulation is considerably simplified with the novel optical cell disclosed herein.

These results are achieved by utilizing a liquid ultrasonic cell in which a single transducer in the form of a circular cylinder or a section of arc of a circular cylinder is actuated by an alternating voltage to produce standing sonic waves in the liquid. When a small diameter optical beam such as a laser beam traverses the cell normal to the plane of the sonic waves, the optical beam is deflected at a rotating large angle to thereby produce a circular scanning motion. Deflection angles are greatest where the sonic wave pressure amplitudes peak in the transducer focal region. When the beam traverses the cell along the $y$ axis, the deflection is linear and maximum at the focus. As the beam is moved to various positions away from the focal point, the beam deflection pattern will change as subsequently described.

The ultrasonic standing wave generates a time-varying density disturbance in the transparent, refractive material within the cell. In this manner a time varying refractive index gradient is created which will deflect the light beam at the ultrasonic driving frequency. If the beam is small in diameter relative to the sonic wavelength, the divergence of the light beam will not be significantly affected.

It is therefore an object of this invention to provide an ultrasonic optical beam scanning cell which produces a circular deflection.

Another object of this invention is a liquid ultrasonic cell in which a single transducer in the form of a circular cylinder produces sonic waves in the liquid.

A further object of this invention is a liquid ultrasonic cell in which a single transducer in the form a section of arc of a cylinder produces sonic waves in the liquid.

A further object of this invention is an ultrasonic optical beam scanning cell which may be used to internally modulate the output of a laser.

Another object of this invention is a novel transducer for use in an ultrasonic cell.

A further object of this invention is a novel liquid ultrasonic cell which produces a circular trace in which the radious is continuously controllable over an angle from 0 to 2° or more.

These and other objects of the invention may be better understood by referring to the following description and claims, read in conjunction with the accompanying drawings, in which:

FIGURE 1 is a breakaway view of the cell and transducer assembly; and

FIGURE 2 is an end view of the cell and transducer; and

Figure 5A:
Figure 5B:
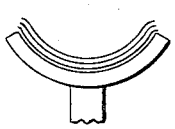
Figure 5C:
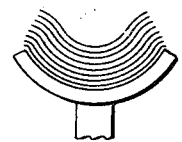
Figure 5D:
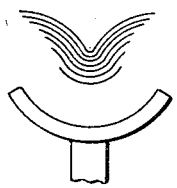
Figure 5E:
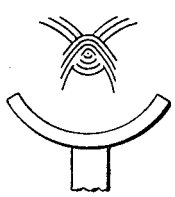
Figure 5F:
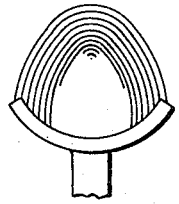

FIGURE 3 shows schematically the theory of ultrasonic deflection of a light beam; and FIGURE 4 shows the beam deflection pattern as a function of the location in the acoustic field near the focal point; and FIGURE 5 illustrates the propagation of a train of travelling ultrasonic waves within the cell; and FIGURE 6 shows the motion of the circular trace at various camera prism rotation speeds; and FIGURE 7 shows in block diagram form the use of the novel ultrasonic cell in a laser-optical resonator cavity; and FIGURES 8 and 9 show various transducer arrangements.

The basic physical principle on which the optical beam scanning cell operates is that a beam of light in passing through a density gradient normal to the direction of light propagation will be bent towards the region of higher index of refraction. Thus by setting up an ultrasonic standing wave in a refractive medium, a time-varying density gradient will be established which will alternately refract a light beam back and forth at the ultrasonic driving frequency. The angular deflection $\theta$ that a light beam will be deviated in traversing a sonic field is directly proportional to the optical path length $\delta$ in the field, the acoustical pressure variation $\Delta P$, the compressibility $k$ of the material, and an optical index of refraction term $(n^2-1)(n^2+2)/6n$, and is inversely proportional to the sonic wavelength $\lambda_s$. Up to a limit, increasing $\delta$ with a longer transducer section along its axis produces a greater deflection $\theta$.

FIGURE 3 is a schematic representation of an ultrasonic scanning cell in which a transducer 10, driven by means not shown, sets up a standing wave within the medium 12. At time $t$ the ultrasonic wave of wavelength $\lambda_s$ will have a pressure gradient as shown by curve $T_1$, and the beam 14 will be bent as indicated at $T_1'$. Curves $T_1$, $T_2$ and $T_3$ represent acoustical pressure gradients within the cell in which the portions of the curves to the right of the centerline illustrate regions of higher density, and the portions of the curves to the left of the centerline illustrate regions of lower density. At time $t$, the pressure gradient is shown by $T_1$, and the effect upon the beam is shown at $T_1'$. At a time equal to a quarter of a period later, the pressure gradient within the medium 12 is given by curve $T_2$, that is there is no pressure gradient within the medium and the light beam 14 is not deflected as shown at $T_2'$. Another quarter of a period later the pressure gradient is shown by curve $T_3$, this curve being 180° out of phase with original curve $T_1$, and the beam of light 14 is bent to a position as shown at $T_3'$.

FIGURES 1 and 2 show the construction of the ultrasonic deflection cell. A typical cell will be described, but it is apparent that the dimensions and materials of construction may be varied to suit the particular application. The cell 16 consists of a rectangular container having inside dimensions of 8.9 cm. x 14.0 cm. x 19.1 cm. Two of the vertical sides, 18 and 20, are 2.54 mm. glass and the other sides 21 and 23, top 25 and bottom 27 are 6.35 mm. aluminum lined with a 1.5 cm. thickness of acoustical absorbing Fiberglas padding 22. The transducer 24 is preferably a piezoelectric ceramic such as barium titanate, and is mounted on a 1.7 cm. diameter glass tubing pedestal 26, 8.9 cm. from the bottom, with epoxy cement. The transducer 24 is a 2.54 cm. length of a right circular cylinder of 7.62 cm. outside diameter, subtending an arc of 120° having a wall thickness of 0.635 cm. The transducer half-wave thickness resonance is subject to design choice, for example 400 kc. per second, and silver electrodes 28 and 30 are plated on the inner and outer curved surfaces. An electrical connection from outside the cell is made to each of these electrodes. The transducer is centered in the cell or liquid container 16.

The liquid media found most suitable for ease of handling and best results are either ether trichloroethylene with an index of refraction of 1.478 and a specific gravity of 1.456, or tetrachloroethylene having refractive index of 1.505 and specific gravity of 1.631. Other suitable liquids may be used. These organic solvents are nonflammable and have both a relatively high optical refractive index to density ratio and are transparent over most of the visible spectrum. These two criteria are the most important for sonic-optic applications. A third property is also considered desirable, i.e., a relatively low velocity of sound propagation for low frequency operation. For the latter liquid the value is $1.032 \times 10^5$ cm. per second.

To produce a circular scanning pattern with a laser beam, the highly collimated laser beam is directed through the glass wall of the cell and through the liquid cell at a point just off center to either side of the focal point of the ultrasonic transducer. The transducer is excited by a sinusoidal electrical signal. Measurements of the direction of rotation and rotational frequency of the circular scanning trace with variations in the location of the laser beam relative to the focal point of the acoustical field are shown graphically in FIGURE 4 which is a polar plot depicting the type of scanning motion as a function of distance from the focal point in four different directions. The magnitudes of the deflections correspond to those measured on a screen at a distance from the cell, and are approximately 20 times true scale. Deflection angles are greatest where the pressure amplitudes peak in the focal region. In the dominant radial field, e.g. along the y axis, the deflection is linear and maximum at the focus. Because of the interaction of the transducer end point pressure waves, as the beam is moved to various positions away from the focal point the circular scans indicated alternate with linear scans both horizontal and vertical depending upon the acoustical field at that particular point. The third circle from the focus is not open enough to determine the actual direction of rotation, however the acoustic field exhibits mirror symmetry by reflection if the transducer vibrates uniformly, and the rotation of each circle is uniquely defined by mathematical analysis.

While the most extensively investigated transducer section was 120° in arc, other arcs of 30°, 60°, 90° and 180° have been found to produce reasonably round circles before cavitation occurs. The largest deflection amplitudes are obtained with a *full cylinder* transducer operating in a mode where a strong standing wave is produced between two opposing portions subtending, for example, an angle of 90° through the axis. With a liquid-filled cylindrical transducer operating in such a mode, both linear and two-dimensional beam scanning motions have been observed. However, this mode of operation has not thus far proven to be as stable as the previously described focusing transducers.

FIGURE 8 shows a transducer arrangement in which two 120° transducers 100 and 102 are bonded to opposite walls of a liquid-filled enclosure 104. Any type of bonding which does not restrict the vibratory motion of the transducers more than a slight extent is acceptable. The transducers have bonded thereto silver electrodes 106 and 108. The transducers 100 and 102 are focused at the same point within the liquid enclosure, and the frequency of operation and spacing are chosen to prevent destructive interference between the acoustic waves. The acoustic waves will be reinforced and thereby produce a stronger field.

FIGURE 9 shows a circular ring ceramic transducer 112 having glass walls 114 and 116. Electrodes 118 and 120 are bonded to the outside and inside respectively of the transducer and are focused similarly to the transducers of FIGURE 8. Two dimensional scanning is produced as before when an optical beam is passed through the glass walls at the focus of said electrodes.

FIGURE 5 illustrates a series of high-speed frame photographs of wave propagation in tetrachloroethylene with a barium titanate 120° cylindrical transducer. FIGURE 5A shows the standing wave in shadowgraph form and illustrates the strong compressional radial field in the fundamental operating mode of the transducer. Waves produced by the transducer ends interact with the radial field and with each other to the right and left of the focus. FIGURES 5B thru 5F display the progressive motion of wavefronts generated by a single four-microsecond pulse excitation of the transducer, and show the wave propagation at approximately 12 microsecond intervals. The first few waves appear to be purely the fundamental compressional mode, while subsequent ringing of the transducer will introduce circumferential vibrations which interact with and distort later wavefronts to some extent. As the waves travel through the focus they change from concave to convex and appear to open up from the transducer end points.

Figure 6A:
Figure 6B:
Figure 6C:
Figure 6D:
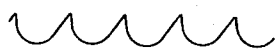

FIGURE 6A shows a still exposure of the circular trace taken by transmission through the translucent screen at $\frac{1}{1000}$ of a second. FIGURES 6B, C and D are streak records of this motion taken at various camera mirror rotation speeds. The laser beam writes a continuous series of loops as the image is caused to move slowly by the film as shown in FIGURE 6B, having a mirror speed of 300 r.p.s. FIGURE 6C was taken with the mirror at 750 r.p.s. and shows that the loop ends become cusps. FIGURE 6D was taken at a mirror speed of 1,500 r.p.s., and shows that the identity of the loop is lost. These figures illustrate the relatively good scanning resolution obtainable with this simple, unpressurized ultrasonic cell.

FIGURE 7 shows the use of the ultrasonic cell of this invention to internally modulate the output of a laser to thereby produce one or more large output pulses. Referring to the figure, there is shown a ruby laser 42 with a pumping lamp 44 which has a DC power supply 46 connected thereto. A triggering circuit 50 is provided for lamp 44. The lamp 44 and lighting circuitry are conventional laser pumping apparatus and form no part of the present invention. Laser 42 is a standard ruby laser except that only one end has the usual reflective coating or mirror 52 while the other end is uncoated and the mirror usually present is moved outboard as at 54. An ultrasonic cell 56 similar to that described in FIGURE 1 is interposed between the uncoated end of the laser and mirror 54 so that cell 56 is in the optical cavity of the laser. The output for the trigger 50 is passed through a variable delay 70 and thence to a pulse generator 72, the output from the pulse generator 72 trailing the initiation of pumping light by a predetermined time, for example 100 microseconds. Pulser 72 excites the transducer in ultrasonic cell 56 which generates a strong travelling shock front and a few ringing waves within the cell. Mirror 54 is deviated from parallelism with mirror 52, i.e. mirror 54 forms an acute angle with the axis of ruby 42 of, for example, one minute of arc, and there is a deliberate delay between initiation of pumping of ruby 42 and excitation of cell 56. The angle is exaggerated in the figure. The pumping of ruby 42 is initiated prior to the excitation of ultrasonic cell 56 due to delay 70. The deviation from parallelism of mirror 54 is such that for a given amount of pumping enough of the spontaneous fluorescence from ruby 42 is deflected away from the ruby rather than returned to it so that lasing of the ruby is prevented. In essence, the optical feedback path to the ruby has been blocked, i.e., a high value for the threshold energy of the laser is created, the device will not oscillate, and a large overpopulation of excited atoms results. Variable delay 70 is set to actuate pulser 72 and pulse the transducer with a high voltage to pass an ultrasonic wave through the medium within cell 56, preferably when overpopulation is at a maximum. When the shock front of the pulse nears the ruby axis the spontaneous radiation from ruby 42 passing through cell 56 to mirror 54 interacts with the ultrasonic wave and is refracted, the wavelength of the ultrasonic wave in cell 56 being much greater than the width of the laser beam, and a condition will occur when the radiation will be directed perpendicular to mirror 54. At this time a high restoration of positive feedback to ruby 42 is initiated and laser action will occur with a very large burst of radiation. If the transducer is excited by a sine-wave generator, instead of a pulser, the laser output spikes may be gated at the standing wave frequency.

It is also apparent that the laser beam can be intensity modulated by varying the signal applied to the transducer within the ultrasonic cell. With the mirrors 52 and 54 in exact alignment, lasing will take place when no signal is applied to the ultrasonic cell, and the lasing action will diminish thereby reducing the intensity of the output when a signal is applied to the cell transducer. Other modifications are readily apparent to those skilled in the art.

It is to be understood that the invention is not limited to the specific embodiment herein illustrated and described but may be used in other ways without departure from the scope of the invention as defined by the following claims.

I claim:

1. Apparatus for deflecting an optical beam in a two dimensional scanning pattern comprising:
    an enclosed chamber having apertures there in and containing a light transparent medium,
    a first curved transducer having a focal point at the center of curvature thereof mounted within said chamber,
    means to actuate said transducer to produce standing sonic waves in said medium and a resultant time variation in the refractive index of said medium, said sonic waves being focused at said focal point,
    an optical beam,
    and means for directing said beam through said chamber apertures to pass through said sonic waves at a point slightly removed from said focal point, said optical beam interacting with the time variation in the refractive index of said medium to cause a two dimensional motion of said beam as it passes through said sonic waves.

2. Apparatus as in claim 1 and including a second curved transducer positioned in said chamber and having a focal point identical with the focal point of said first transducer,
    and means for actuating said second transducer to produce a second series of sonic waves focused at said focal point.

3. Apparatus as in claim 2 in which said first and second transducers are in the form of a section of arc of a circular cylinder,
    said transducers being mounted directly opposite each other within said enclosure with the concave portions of said transducers facing each other.

4. Apparatus as in claim 1 in which said first transducer is in the form of a section of arc of a circular cylinder.

5. Apparatus as in claim 1 in which said first transducer is in the form of a circular ring.

6. Apparatus as in claim 5 in which first and second opposing portions of said circular transducer are actuated to produce a standing wave at a focal point therebetween.

7. Apparatus as in claim 1 in which a circular scanning pattern of said optical beam is produced comprising:
    means to apply a sinusoidal actuating signal to said transducer,
    and means for directing said optical beam through said sonic waves at a point slightly to one side of the point of focus in a plane perpendicular to the direction of propagation of said sonic waves through said medium.

8. Apparatus as in claim 1 in which said light transparent medium is liquid having a relatively high optical refractive index to density ratio.

9. Apparatus as in claim 8 in which said liquid medium is contained within said chamber by means of optically transmitting walls attached to said transducer.

10. Apparatus as in claim 1 in which said transducer is a piezoelectric material.

11. Apparatus as in claim 10 in which said means to actuate said transducer comprises metallic electrodes bonded to opposite sides of said transducer.

References Cited
UNITED STATES PATENTS

| 3,121,169 | 2/1964 | Benton | 350—161 |
|---|---|---|---|
| 3,297,876 | 1/1967 | De Maria | 250—199 |

JEWELL H. PEDERSEN, *Primary Examiner.*

B. REYES, R. F. WIBERT *Assistant Examiners.*